(12) United States Patent
Dominique

(10) Patent No.: US 6,466,366 B1
(45) Date of Patent: Oct. 15, 2002

(54) MICROSCOPE WITH END PLATE AND ADAPTER FOR VIEWING MULTI-FIBER CONNECTORS

(76) Inventor: Jeffrey Michael Dominique, 9509 S. Michelle La., Tempe, AZ (US) 85284

( * ) Notice: Subject to any disclaimer, the term of this patent is extended or adjusted under 35 U.S.C. 154(b) by 0 days.

(21) Appl. No.: 09/845,876

(22) Filed: Apr. 30, 2001

Related U.S. Application Data

(60) Provisional application No. 60/206,088, filed on May 20, 2000.

(51) Int. Cl.[7] ............................................... G02B 21/00
(52) U.S. Cl. ....................... 359/379; 359/384; 359/801; 65/158; 356/73.1; 385/90
(58) Field of Search ................................. 359/384, 379, 359/391, 392, 394, 368, 385, 801, 804; 356/73.1; 65/158; 385/25, 90; 269/58

(56) References Cited

U.S. PATENT DOCUMENTS 4,505,556 A  *  3/1985  Bridson et al. ............... 269/71
5,196,899 A  *  3/1993  Serwatka ..................... 356/73.1
5,731,893 A  *  3/1998  Dominique .................. 359/379
5,982,533 A  * 11/1999  Dominique .................. 359/379

* cited by examiner

Primary Examiner—Cassandra Spyrou
Assistant Examiner—Lee Fineman

(57) ABSTRACT

The portable microscope includes an end plate and pivotable adapter for improved inspection of multiple fiber optic cables in a single connector. The end plate is mounted on the head unit housing of the microscope. The adapter is mounted on a pivot cylinder extending from the end plate. The adapter includes a jig for receiving and retaining a connector. Each fiber optic cable in the connector can be inspected one at a time by pivoting the adapter so that each of the fiber optic cables is in view through the microscope. The adapter also includes an aperture which is positioned over the head of the fastener used to connect the end plate to the housing. The pivoting movement of the adapter is limited by the engagement of the aperture against the head of the fastener.

14 Claims, 4 Drawing Sheets

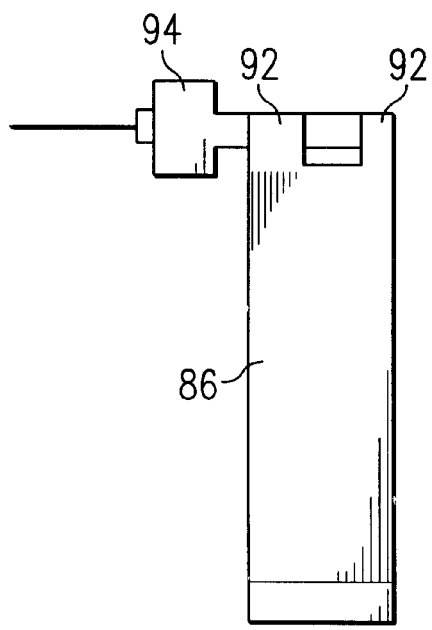
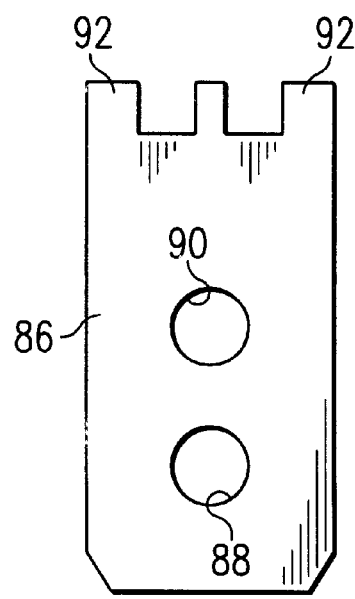
FIG. 8          FIG. 9
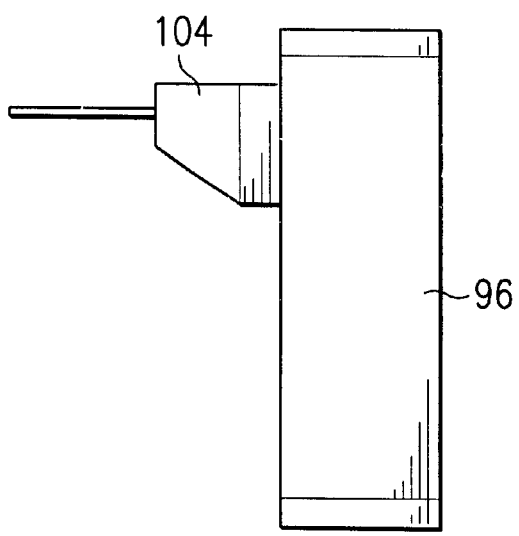
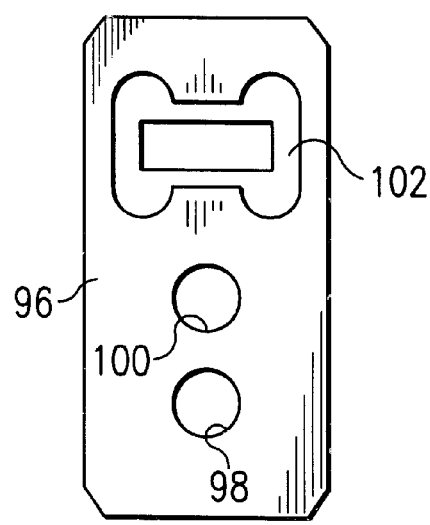
FIG. 10         FIG. 11

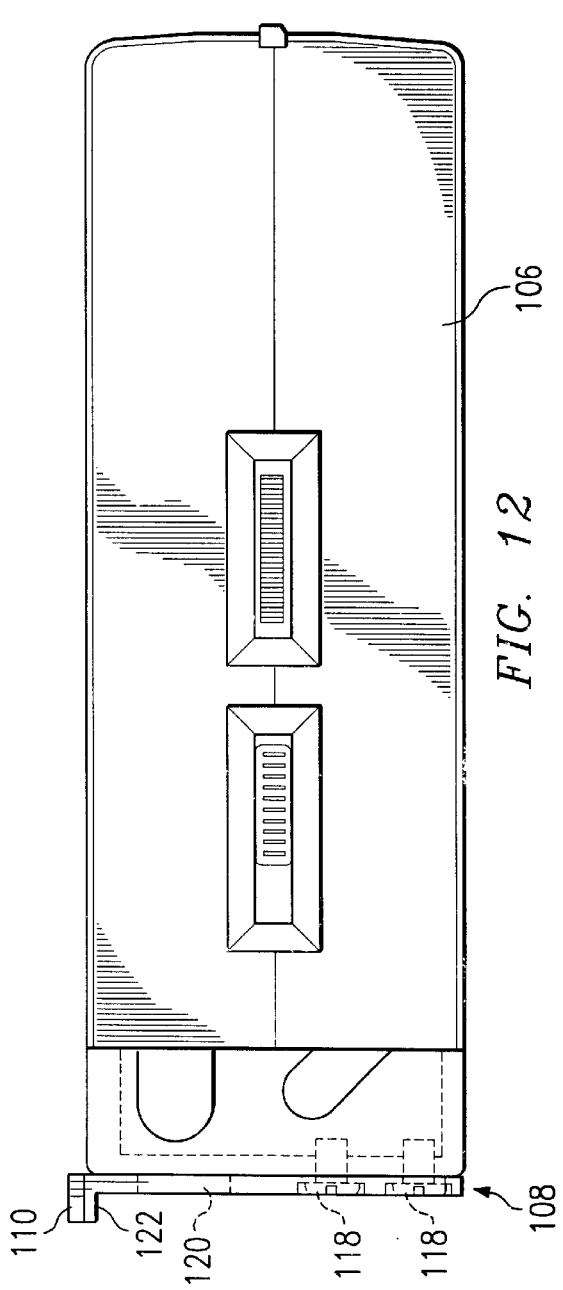
FIG. 12
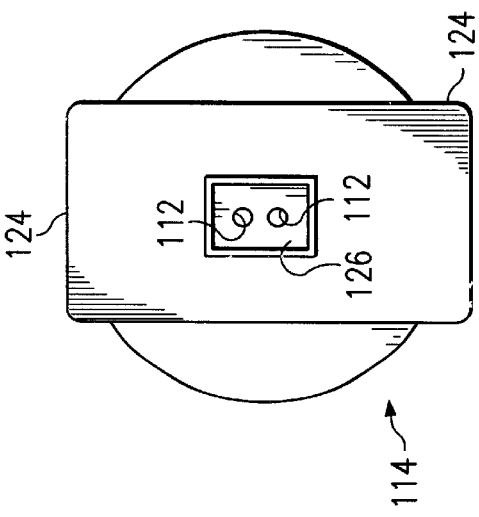
FIG. 15
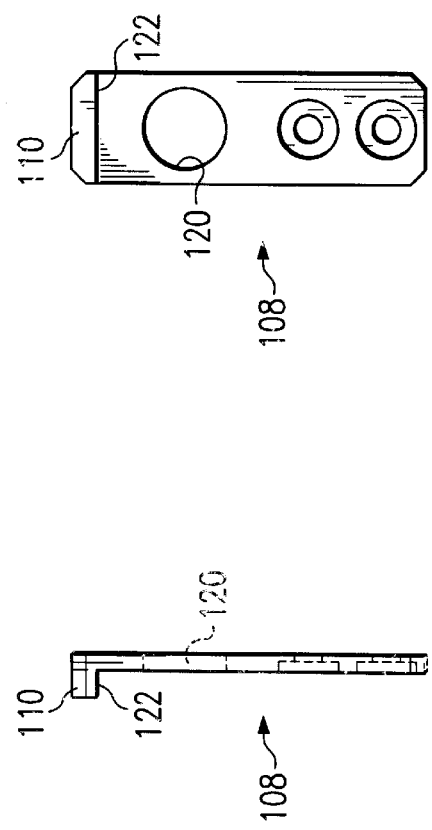
FIG. 14
FIG. 13

MICROSCOPE WITH END PLATE AND ADAPTER FOR VIEWING MULTI-FIBER CONNECTORS

This application claims the benefit of U.S. provisional application No. 60/206,088 filed May 20, 2000.

BACKGROUND OF THE INVENTION

1. Field of the Invention

The present invention relates to a portable microscope for use in inspecting fiber optic connections, and more particularly, to a portable microscope with an end plate and adapter for inspecting an end of a fiber optic cable. The adapter of the portable microscope is movable to facilitate viewing of multiple fibers mounted in a single connector.

2. Summary of Related Art

Fiber optic systems have optical connections at each junction between a fiber optic cable and a light source or detector. Connections are also needed to join or splice together the ends of two cables. Since each fiber optic system will include a number of junctions of fiber optic cable, it is essential that the technicians working on fiber optic cables in the field use a microscope and other tools to properly connect the fiber optic cables.

In the installation of a fiber optic system, transmitters and receivers may be positioned throughout the system at the desired locations for transmitting and receiving signals. The transmitters and receivers are mounted in a light interface unit which includes both electrical receptacles for input/output of electrical signals and lighting receptacles for the input/output of light signals. After the light interface units with transmitters and receivers have been installed and the cable between the light interface units pulled, one of the final field steps to complete the installation is connectorization, which is the connection of fiber optic connectors to the ends of the fiber optic cables to facilitate the proper alignment of the core of the fiber optic cable at the fiber optic connections.

In a fiber optic system, a receptacle is a termination device for a fiber optic connection. The receptacle has two ports aligned with a center aperture to promote proper alignment of the fiber optic cable cores at the point of connection. In a light interface unit, the receptacle is mounted in a fixed position with one port connected to a transmitter or receiver and the second port aligned for the insertion of a connector on the end of the fiber optic cable. Receptacles are also used outside of the light interface units to splice together two fiber optic cables.

The fiber optic cables used in a system will have a connector secured to each end of the fiber optic cable, the connector being designed for insertion and locking in the receptacle. The cable is stored on spools and is pulled from the spools in the field during installation. Several different types of receptacles and connectors are available for use in fiber optic systems.

The connectors are typically installed on the fiber optic cable in the field at the time of installation. The fiber optic cable is stripped of its protective covering and the glass core and cladding are inserted into the connector such that the glass core extends from the ferrule at the end of the connector. The cable is epoxied into the connector and the glass core at the end of the ferrule is cleaved and polished using a lapping process.

The polished end of the core of the cable must be inspected to ensure that the end surface is clean and scratch free. Any scratches or cracks in the end of the glass fiber will adversely effect the integrity of the connection. Even body oils, lint or dust can cause unacceptable losses at the connection.

Because the glass core of a fiber optic cable is so small and because a good connection is essential to the overall efficiency of the system, a portable microscope for use in connecting the connectors to the fiber optic cable is an essential tool for the technician. The technician in the field must be able to inspect the end of the core of the fiber optic cable to ensure a smooth and clean surface for transmission of the light.

U.S. Pat. Nos. 5,731,893 and 5,982,533 are patents directed to portable microscopes and issued to the present inventor. These two patents contain additional background information and are incorporated herein by reference. Additional microscopes for inspection of fiber optic cables are disclosed in U.S. Pat. Nos. 4,505,556; 4,595,265; 4,640,578; 4,671,629; and 5,196,899.

Connectors with multiple fibers are now being used in the industry. The multi-fiber connectors permit several fibers in the same space as a standard connector. In a typical two-fiber connector, the fibers are 4.5 millimeters apart. Such spacing between the fibers makes it more difficult to inspect the fibers, since the connector must be repositioned to inspect the ends of both of the fibers. The technician must inspect all of the fiber ends in the connector, and it is difficult to conduct a field inspection of a multi-fiber connector using a microscope with a typical fixed endplate configuration.

Technicians have a need for a microscope endplate which facilitates the inspection of all the fiber ends of a multi-fiber connector. The endplate should include an adjustable head which permits each of the fiber ends to be positioned in the viewing range of the scope at the proper magnification for inspection. Once the block of the connector is positioned in the endplate of the microscope, it is desirable to inspect all of the fibers without removing the connector from the endplate.

A polishing puck may be used to polish the ends of the fiber optic cables in the connector. Technicians also need the capabilities of inspecting the ends of the fiber optic cable when secure to the polishing puck. The inspection and any additional polishing could be accomplished in a single puck mounting. Technicians would not have to remount the connector in the puck if further polishing was required after inspection.

A number of multi-fiber connectors are being used in the industry. The multi-fiber connectors currently include 2 to 12 fibers in each connector. Lucent Corporation manufactures an LC connector, which is a two fiber connector about one-half the size of a normal SC connector. Siecor and others provide a connector, such as the MT-RJ, which also includes 2 fibers in a single connector. The MTP connector by Siecor Corporation is used with a 12 fiber ribbon. The Volition VF-45, SG series of connectors is built by 3M Company and includes multiple fibers. In general, the spacing between the two fibers of a two-fiber connector is 4.5 millimeters.

SUMMARY OF THE INVENTION

In accordance with the present invention, there is provided a portable microscope with an adjustable end plate for improved inspection of the end surface of multiple fiber optic cables mounted in a single connector. The hand held microscope used for field inspection of fiber optic surfaces at connection points typically includes 100× magnification capabilities and a battery powered light source. Hand held microscopes with 200× and greater magnification are also available for field use.

The end plate of the hand held microscope of the present invention is mounted on the head unit housing of the microscope and includes a movable adapter or fixture for receiving and adjustably positioning a connector with multiple fiber optic cables. The adapter includes a jig formed on one side to retain and position the connector for viewing of the ends of the fiber optic cables.

Because the microscope can only focus on one end of a fiber optic cable at a time, and because the cables are spaced apart, it is necessary to move reposition the connector to view all of the fiber optic cables. Once the connector is mounted in the adapter of the present invention, the position of the connector may be adjusted by pivoting the adapter on the end plate to facilitate inspection of all of the fiber optic cables in the connector.

The end plate of the hand held microscope may also be formed of a flat surface to engage the face of a polishing puck with the connector secured to the puck. The ends of the fiber optic cables are generally co-planar with the surface of the puck. The end plate includes a support flange such that the flange engages the edge of the puck and facilitates the positioning of the ends of the fiber optic cable for viewing.

For the movable adapters, the end plate includes a common base plate secured to head unit housing, and a post or other means for pivotably securing the adapter to the end plate. The adapter is a fixture having a jig formed for receiving and positioning the connector. The adapter is pivotably connected to the end plate such that all of the fibers in a multi-fiber adapter can be inspected by pivoting (rotating) the adapter on the end plate.

The end plate is secured to the end surface of the head unit housing. The head unit housing includes three apertures, a large aperture at one side for viewing purposes, a center aperture for securing the end plate, and an aperture for receiving a stabilizer bar or pin extending from the end plate. A flat head screw is used to secure the end plate to the head unit housing. The stabilizer bar is important in preventing the end plate from rotating about the screw.

The outer surface of the end plate includes a cylindrical extension, which is used to pivotably secure one end of the adapter to the end plate. The bottom surface of the adapter includes an aperture, which is positioned about the flat head screw used to secure the end plate. When the adapter is pivoted about the extension, the flat head screw engages the edge of the aperture in the adapter and acts as a stop to limit the range of rotation. Since the ends of the fiber optic cable mounted in the adapter are in close proximity, the adapter only requires a small degree of movement to permit inspection viewing of the ends of the fiber optic cables.

The end of the adapter adjacent the viewing aperture of the end of the head unit housing is formed to receive and position the connector for viewing the ends of the fiber optic cable. The connector is retained in the adapter and the adapter is pivoted about the end plate so that every one of the fiber optic cables can be inspected.

Since each of the main connectors used in the industry has a different external configuration, a single adapter will not accommodate all of the connectors. In the present invention, a common end plate can be used with various adapter configurations. The jig formed on one side of the adapter is changed for each of the embodiments of the adapter. Because only a single screw is used to retain the adapter to the cylindrical extension of the end plate, a technician can easily change from one adapter to another when encountering different connectors.

The present invention provides a portable microscope with improved fiber optic cable inspection capabilities for multiple fiber connectors. By pivoting the adapter on the end plate, all of the fiber ends in a multi-fiber connector can be inspected in quick and convenient manner.

The present invention also provides adapters having jigs design to receive and retain connectors such that the ends of the fiber optic cables in the connectors are in the desired position for inspection. For the technician who works on a variety of multi-fiber connectors, the different adapters may be changed by a single screw connection to the end plate.

The head unit housing contains mounting holes for securing the end plate to the housing at the end of the microscope. The hole configuration may also be used to mount other end plates as disclosed in applicants earlier patents, U.S. Pat. Nos. 5,731,893 and 5,982,533. By maintaining the same hole configurations in the housing, a single microscope can accommodate a variety of single fiber and multi-fiber end plates.

The present invention also includes an alternative embodiment of an end plate, which is used for viewing the fiber optic cables in a connector mounted in a polishing puck. The end plate includes a retention flange or ridge which assists in positioning the ends of the fiber optic cables in position for viewing. The technician may inspect the ends of the cables and then immediately resume the polishing process if the inspection indicates that further polishing is required.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 8 a front view of a third embodiment of the adapter shown for mounting on the same end plate, said adapter having a jig formed at one end for receiving a connector;

FIG. 9 is an end view of the adapter shown in FIG. 8 showing the two apertures formed in the adapter;

FIG. 10 is a front view of a fourth embodiment of the adapter own for mounting on the same end plate, said adapter having jig formed at one end for receiving a connector;

FIG. 11 is an end view of the adapter shown in FIG. 10 showing the aperatures formed in the adapter;

FIG. 12 is front plan view of a portable microscope including an end plate with a flange for positioning a polishing puck with connector such that the ends of the fiber optic cables are positioned for viewing;

FIG. 13 is a front view of the end plate shown in FIG. 12;

FIG. 14 is an end view of the end plate shown in FIG. 12; and

FIG. 15 is an enlarged bottom view of a polishing puck with a connector mounted for polishing the ends of the fiber optic cables showing the edge of the puck which engages the flange of the end plate.

DESCRIPTION OF THE PREFERRED EMBODIMENT

Figure 1:
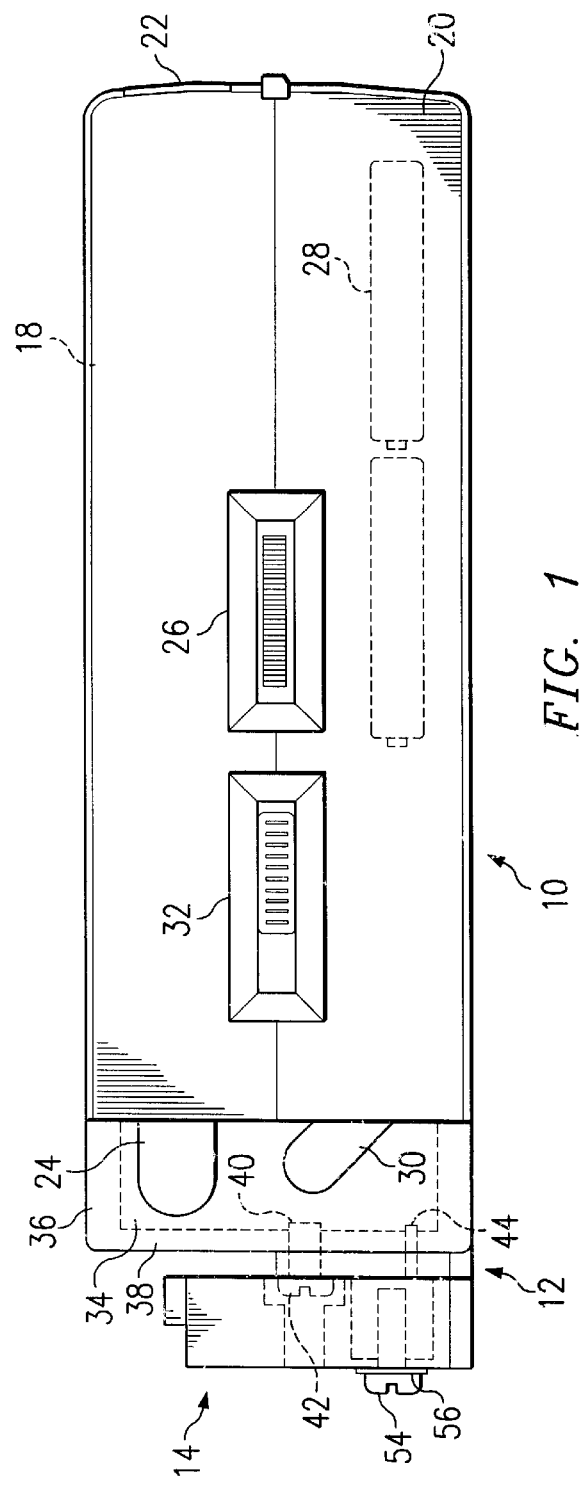
FIG. 1 front plan view of a portable microscope including an end plate and an adapter pivotably secured to the end plate.

Referring now to FIG. 1, there is shown a portable microscope 10 with an end plate 12 secured to the end of the microscope 10. As hereinafter described, the microscope 10 is used to inspect the end surface of a glass fiber. In a fiber optic junction, the glass fiber is secured in a fiber optic connector such that the end surface of the glass fiber is exposed for transmission of a light signal to a glass fiber in an adjacent connector. Multi-fiber connectors are now used in the industry such that the connector is used to secure two or more fibers. Connectors currently contain between 2–12 fibers, but the present invention would apply to any number of fibers in a connector.

When installing or repairing a fiber optic system, the technician must inspect the end of the glass fibers after the fibers have been secured in the connector. The inspection is accomplished by insertion of the connector into a jig 16 on an adapter 14 mounted on the end plate 12. The ends of the glass fibers are positioned for viewing through the microscope 10. The fibers in a two-fiber connector are spaced apart with approximately 4.5 millimeters between glass fibers. The distance between fibers in a connector may vary without effecting the operation of the present invention. The adapter 14 is pivotably connected to the end plate 12 such that the adapter may be moved to position each of the fibers of a fiber optic connector in position for viewing through the microscope 10.

The portable microscope 10 has two longitudinal, internal compartments, a first compartment 18 for the magnifying components of the microscope and a second compartment 20 for the battery powered light source. The magnifying components include a viewing lens 22 at one end of the microscope 10 and an adjustable focus lens 24 at the other end of the microscope 10. The position of the adjustable focus lens 24 is adjusted by turning positioning knob 26 in the body of the microscope 10.

The light source in compartment 20 includes batteries 28 to power light bulb 30 which is positioned at an angle to direct the light in the desired direction. An on-off switch 32 is conveniently located on the microscope 10.

A viewing chamber 34 is formed at the cable end of the microscope 10 by a head unit housing 36 having side walls, end walls, and a partial top 38. The housing is typically made from a clear plastic material, but any rigid, lightweight material could be used to form the housing. The housing is permanently affixed to the end of the microscope 10.

The end plate 12 is affixed to the partial top 38 of the head unit housing 36. The end plate 12 may be glued to the top 42 or secured by two fasteners, such as set screws, extending through the end plate 12 into the top 38. More details regarding the housing and basic configuration of the microscope are included in applicant's prior patents, U.S. Pat. Nos. 5,731,893 and 5,982,533, which are incorporated herein by reference. The end plate 12 and adapter 14 have been modified to accommodate the multi-fiber connectors.

In FIG. 1 of the present application, a single set screw 40 is shown connecting the base plate 12 to the top 38 of the housing 36. The screw 40 includes a head 42 which extends from the surface of the end plate 12. In FIG. 1, the second fastener is long spring pin 44, which prevents the end plate 12 from rotating on the top 38 of the housing 36.

Figure 2:
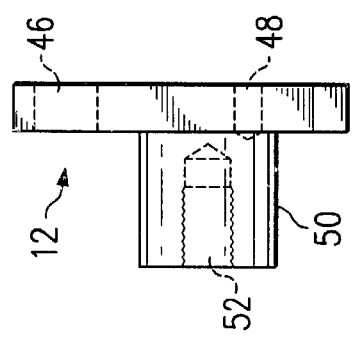
FIG. 2 is a front view of the end plate shown in FIG. 1.
Figure 3:
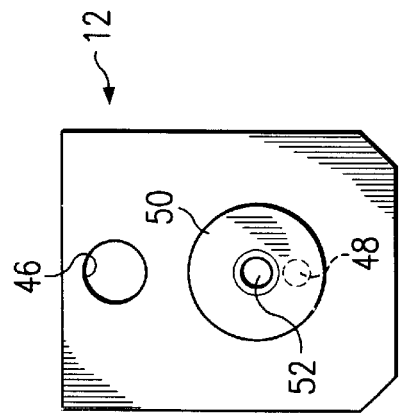
FIG. 3 is an end view of the end plate in FIG. 1.

The end plate 12 of the present invention is shown in more detail in FIGS. 2–3. The aperture 46 is sized to accept the screw 40 used to connect the end plate 12 to the top 38 of the housing 36. The second aperture 48 is used to retain the spring pin 44.

The end plate 12 includes a pivot cylinder 50 extending from the outer surface of the end plate 12. The pivot cylinder 50 is drilled and tapped to form an aperture 52 for accepting a fastener, such as screw 54 shown in FIG. 1. The aperture 52 may, for example, be drilled to a depth of 0.35 inches and then tapped to a depth of 0.23 inches. A washer 56 is included for use in connection with the screw 54 in aperture 52. The washer 56 may be, for example, a black nylon shoulder washer. The screw 54 is tightened to retain the adapter 14 on the end plate, but is not over-tightened to restrict the pivoting movement of the adapter 14 on the pivot cylinder 50.

Figure 4A:
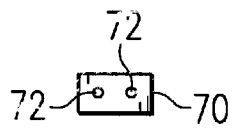
FIG. 4A shows the end of the connector with the fiber cable ends being inspected.
Figure 4:
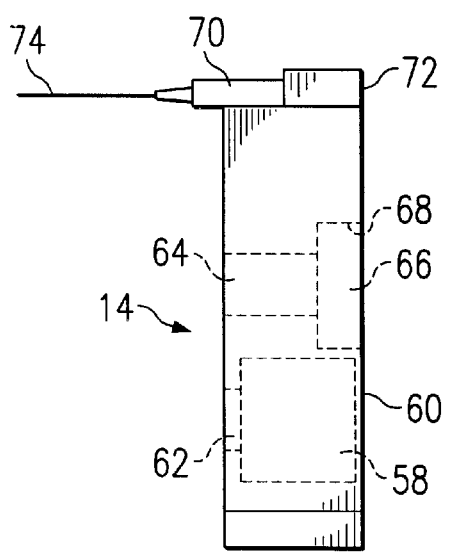
FIG. 4 is a front view of the adapter shown in FIG. 1 having a jig for receiving a connector formed at one end.
Figure 5:
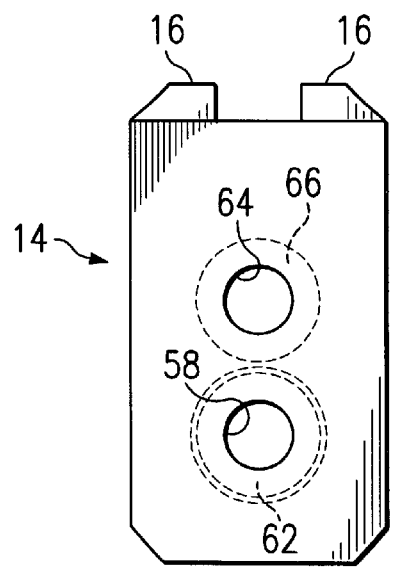
FIG. 5 is an end view of the adapter shown in FIG. 1 showing the two apertures formed in the adapter.

FIGS. 4–5 shows more details of the adapter 14, which is mounted on the end plate 12 of microscope 10 in FIG. 1. The adapter 14 includes two apertures extending through the body of the adapter 14. The first aperture 58 is used to accept and pivotably connect the adapter 14 to the pivot cylinder 50 of the end plate 12. The first aperture 58 includes a wide end 60 for insertion of the pivot cylinder 50. The narrow end 62 of the aperture 58 is sized for the insertion of the screw 54 and washer 56. The screw 54 extends through the narrow end 62 and into the aperture 52 of the pivot cylinder 50. When a screw 54 is used, the aperture 52 is drilled and tap for use with the screw 54. When the adapter 14 is mounted on the end plate 12, the adapter 14 is pivotable about pivot cylinder 50 of the end plate 12.

The adapter 14 includes a second aperture 64 extending through the body of the adapter 14. The second aperture 64 facilitates access to the screw 40 used to attach the end plate 12 to the top surface 38 of the housing 36. A screw driver can be extended through the aperture 64 to tighten and loosen the screw 40. As will be describe later in this application, the present end plate 12 can be used with different adapters. To change adapters, the technician can remove screw 54, slide the adapter 14 off of the pivot cylinder 50, and then insert an alternative adapter for use with the microscope 10. As disclosed in applicants two patents referenced above, other end plate configurations may also be mounted on the top surface 38 of the housing 36. If the technician wants to remove both the end plate 12 and adapter 14 to attach an alternative end plate, the aperture 64 permits the screw 40 to be loosened such that end plate 12 and adapter 14 can be removed as a single, integral component. The technician does not have to loosen or tighten screw 54 when removing or securing the end plate 12 and adapter 14, which saves some time. Keeping the end plate 12 and adapter 14 as an integral component also facilitates to storage of the end plate 12 and adapter 14.

The second aperture includes an expanded segment 66 for area for receiving the head 42 of the screw 40. The diameter of the expanded segment 66 is larger than the diameter of the head 42 of the screw 40. This expanded segment 66 permits the adapter 14 to be pivoted along the surface of the end plate 12. The adapter 14 may be pivoted until the head 42 engages the surface 68 of the expanded segment 66 of the second aperture 64. The expanded segment 66 is sized to permit the desired movement of the adapter 14 for viewing the fiber cables in the connector 70. By limiting the pivoting movement of the adapter 14, the adapter cannot be moved to a position extending out from the end plate 12. If the adapter could be rotated three hundred sixty degrees, it would be likely to damage the adapter 14 when the adapter 14 was extending from the end plate 12.

The adapter 14 includes a jig 16 formed on the end of the adapter for receiving connector 70, as shown in FIG. 4. When the connector 70 is positioned in the jig 16, the ends 72 of the fiber optic cables 74 are positioned for inspection adjacent the lens 24. The two ends 72 of the fiber optic cables 74 are spaced apart as shown in FIG. 4A. The spacing is approximately 4.5 millimeters. The focus of the lens 24 can be adjusted to view the ends 72, but the lens cannot be moved laterally to view both of the ends 72. By pivoting the adapter 14 about the cylinder 50 extending from the end plate 12, the connector 70 can be moved to selectively inspect both of the ends 72 of the fiber optic cable 74. The adapter 14 maintains the connector 70 in a secure and steady position when inspecting the ends 72. The transition from the first end 72 to the second end 72 is quick and convenient.

The screw 54 is tightened to permit both the movement of the adapter 14 by manually pushing on the sides of the adapter 14, and the steady retention of the adapter 14 when inspecting one of the ends. If the screw 54 is too tight, the adapter 14 is difficult to move. If the screw 54 is too loose, the adapter 14 will not be steady enough for inspecting the ends 72. The use of the washer 56 facilitates the desired tightening of the screw 54 to accomplish both the pivotable movement of the adapter 14 while maintaining the adapter steady for inspection.

The jig 16 is configured to retain generally rectangular connectors 70, such as the MT-RJ fiber blocks manufactured by Siecor and the MTP fiber blocks manufactured by Universal Connect. The MTP contains up to twelve fibers and the adapter 14 can be pivotably moved to view all of the ends of the fibers.

Figure 6:
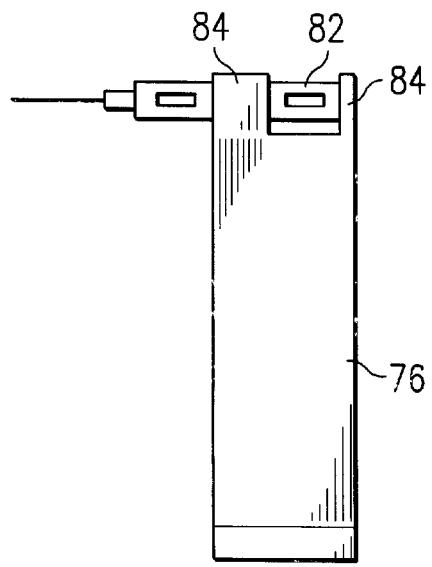
FIG. 6 is a front view of an alternative embodiment of the adapter for mounting on the same end plate, said adapter having a jig formed at one end for receiving a connector.
Figure 7:
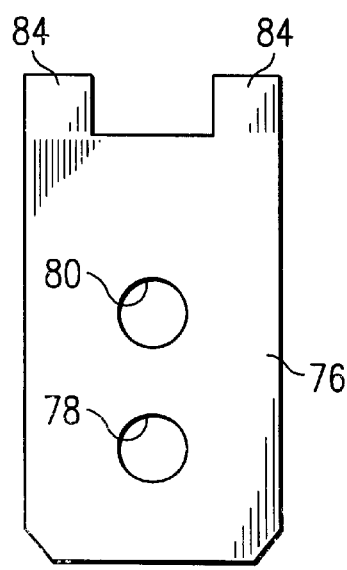
FIG. 7 is an end view of the adapter shown in FIG. 6 showing the two apertures formed in the adapter.

FIGS. 6–7 show an adapter 76, which is alternative embodiment of the adapter 14. The apertures 78, 80 of the adapter 76 are identical to the apertures 58, 64 of adapter 14. The adapter 76 is mounted on the same end plate 12 and may be pivoted about the cylinder 50 for viewing multiple fibers in connector 82. The jig 84 is designed to accommodate the configuration of the connector 82. The connector may be, for example, an MT-RJ (RJ45) connector built by Siecor. In a two-fiber connector, both fibers can be viewed without removing the connector from the adapter 76 connected to the end plate 12 of the microscope 12. As noted above, the end plate can easily be exchanged on the end plate 12 my removing screw 54, exchanging adapter 76 for adapter 14, and then tightening the screw 54.

A variety of alternative jig configurations can be provided to accommodate specific connector designs. FIGS. 8–9 show an adapter 86 with similar apertures 88, 90 for pivotably connecting to end plate 12. Adapter 86 includes jig 92 for securing connector 94. The mounting and pivoting movement of adapter 86 are the same as adapters 14, 76. The jig 92 is to receive and retain connectors similar to the small form factor LC connectors manufactured by Lucent Technologies, Bell Lab Innovations.

FIGS. 10–11 show a fourth embodiment for the adapter to be mounted on end plate 12. The adapter 96 includes the apertures 98, 100 and a jig 102 machined in the adapter 96 for securing connector 104 for viewing of the ends of the fiber optic cables. The jig 102 is designed to retain and position connectors 104 such as the Volition VF-45, SG series of connectors manufactured by 3M Company.

Although the body of the microscope 10 and the head unit housing 36, end plate 12, and adapters 14,76,86,96 of the present invention are generally rectangular in shape, the features of the end plate and adapter could also be used for circular-shaped portable microscopes.

FIGS. 12–15 show a microscope 106 having an end plate 108 with a flanged extension 110 for positioning ends 112 of fiber optic cables mounted in a polishing puck 114. The microscope has the same magnification and lighting systems as shown in microscope 10.

The end plate 108 of microscope 106 includes two mounting apertures which are sized based on the standard mounting screws 118 used to secure end plates to the housing of microscope 106. The end plate 108 includes a viewing aperture 120 adjacent the lens of the microscope 106 to facilitate the inspection of the ends 112 of the fiber optic cables.

The distance between flanged extension 110 and the viewing aperture 120 is sized based on the size of the polishing puck 114. The inner surface 122 of the flanged extension 110 engages the edge 124 of the polishing puck 114 such that the ends 112 of the fiber optic cable are positioned in the viewing aperture 120. Switching between the opposite edges 124 on puck 114 for engaging the flanged extension 110 permits the inspection of both ends 112.

Connector 126 is inserted in polishing puck 114 for polishing the ends 112 of the fiber optic cables. After the initial polishing, the ends 112 are inspected to determine if further polishing is required. Instead of having to remove the connector 126 from the polishing puck 114 for inspecting the ends 112, the ends 112 are inspected while the connector 126 is still in the puck 114.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A portable microscope for inspecting one or more glass fibers secured in a fiber optic connector, said microscope comprising:

an elongate enclosure having a magnifying channel with a head end and viewing end elongated along a first axis;

a housing formed at the head end of said enclosure, said housing including an aperture for receiving at least one glass fiber in a connector;

a magnifying system mounted in the magnifying channel of said enclosure, said magnifying system including an adjustable focus lens positioned for viewing a fiber optic cable in the aperture of said housing;

a light source mounted in said enclosure, said light source directing light into said housing;

an end plate secured to said housing adjacent the aperture, said end plate including a pivot cylinder extending from said end plate; and an adapter pivotably connected to the pivot cylinder of said end plate along said first axis, and including a jig formed in said adapter for receiving a fiber optic connector with one or more glass fibers and extending from a lateral end of the adapter along a second axis perpendicular to the first axis, said adapter being pivotable to selectively position each of the glass fibers for viewing through the adjustable focus lens.

2. The portable microscope defined in claim 1, wherein said adapter includes a cylindrical aperture formed in said adapter for receiving the pivot cylinder of said end plate.

3. The portable microscope defined in claim 1, wherein the pivot cylinder of said end plate includes an aperture at an end of the cylinder and a fastener to secure said adapter to the pivot cylinder of said end plate.

4. The portable microscope defined in claim 3, wherein the adapter includes a cylindrical aperture extending through the adapter, said cylindrical aperture including a wide end for receiving the pivot cylinder of the end plate and a narrow end for receiving the fastener, which secures the adapter to the pivot cylinder.

5. The portable microscope defined in claim 4, wherein said fastener includes a screw and a washer for securing the adapter to the pivot cylinder of the end plate.

6. The portable microscope defined in claim 1, including a fastener for connecting said end plate to said housing, said fastener having a head which extends above an outer surface of said end plate, and including an aperture formed in said adapter and positioned about the head of said fastener on the surface of said end plate, whereby the pivotal movement of said adapter is limited by the engagement of the aperture of said adapter against the head of said fastener.

7. The portable microscope defined in claim 1, including a fastener for connecting said end plate to said housing, said fastener having a head which extends above an outer surface of said end plate, and including an aperture extending through said adapter and positioned about the head of said fastener on the surface of said end plate, whereby the pivotal movement of said adapter is limited by the engagement of the aperture of said adapter against the head of said fastener and whereby the fastener is accessible through the aperture.

8. The portable microscope defined in claim 1, including a first fastener for connecting said end plate to said housing, said first fastener having a head which extends above an outer surface of said end plate, and including a first aperture extending through said adapter and positioned about the head of said first fastener on the surface of said end plate, whereby the pivotal movement of said adapter is limited by the engagement of the first aperture of said adapter against the head of said first fastener and whereby the fastener is accessible through the first aperture; and including a second fastener and a second aperture extending through the adapter, the second aperture receiving the pivot cylinder of the end plate and the second fastener securing the adapter to the pivot cylinder.

9. The portable microscope defined in claim 8, wherein said second fastener includes a screw and a washer for securing the adapter to the pivot cylinder of the end plate.

10. The portable microscope defined in claim 1, wherein the jig of said adapter is designed to receive and retain an MTP type or an MT-RJ connector.

11. The portable microscope defined in claim 1, wherein the jig of said adapter is designed to receive and retain an LC type connector.

12. The portable microscope defined in claim 1, wherein the jig of said adapter is designed to receive and retain an MT-RJ 45 type connector.

13. The portable microscope defined in claim 1, wherein the jig of said adapter is designed to receive and retain a Volition VF-45 type connector.

14. A portable microscope for inspecting fiber optic connectors having one or more glass fibers secured in the fiber optic connector, said microscope comprising:

an elongate enclosure having a magnifying channel with a head end and viewing end elongated along a first axis;

a housing formed at the head end of said enclosure, said housing including an aperture for receiving at least one glass fiber in a connector;

a magnifying system mounted in the magnifying channel of said enclosure, said magnifying system including an adjustable focus lens positioned for viewing a fiber optic cable in the aperture of said housing;

a light source mounted in said enclosure, said light source directing light into said housing;

an end plate secured to said housing adjacent the aperture, said end plate including a pivot cylinder extending from said end plate; and a plurality of adapters, each adapter having an aperture for pivotably connecting the adapter to the pivot cylinder of said end plate along said first axis, and each adapter having a jig formed in said adapter for receiving a fiber optic connector and extending from a lateral end of the adapter along a second axis perpendicular to the first axis, whereby each adapter may be selectively connected to the pivot cylinder depending on the type of connector used to mount the fiber optic cables.

* * * * *